(12) United States Patent
Tracy et al.

(10) Patent No.: US 7,088,601 B2
(45) Date of Patent: Aug. 8, 2006

(54) POWER CONVERSION APPARATUS AND METHODS USING DC BUS SHIFTING

(75) Inventors: John G. Tracy, Raleigh, NC (US); Hans-Erik Pfitzer, Wake Forest, NC (US)

(73) Assignee: Eaton Power Quality Corporation, Cleveland, OH (US)

( * ) Notice: Subject to any disclaimer, the term of this patent is extended or adjusted under 35 U.S.C. 154(b) by 67 days.

(21) Appl. No.: 10/763,962

(22) Filed: Jan. 23, 2004

(65) Prior Publication Data

US 2005/0162137 A1    Jul. 28, 2005

(51) Int. Cl.
*H02M 7/44* (2006.01)
*H02M 7/155* (2006.01)

(52) U.S. Cl. .................... 363/98; 363/133; 307/66

(58) Field of Classification Search ............ 363/98, 363/132, 133; 307/66
See application file for complete search history.

(56) References Cited

U.S. PATENT DOCUMENTS

| | | | | |
|---|---|---|---|---|
| 5,182,518 | A | * | 1/1993 | Stich et al. ............... 324/511 |
| 5,315,497 | A | * | 5/1994 | Severinsky ............... 363/34 |
| 5,343,079 | A | | 8/1994 | Mohan et al. |
| 5,343,080 | A | | 8/1994 | Kammeter |
| 5,434,455 | A | | 7/1995 | Kammeter |
| 5,499,178 | A | | 3/1996 | Mohan |
| 5,642,249 | A | | 6/1997 | Kuznetsov |
| 5,670,833 | A | * | 9/1997 | Mengelt et al. ............ 307/66 |
| 5,883,796 | A | | 3/1999 | Cheng et al. |
| 6,128,204 | A | * | 10/2000 | Munro et al. ............ 363/41 |
| 6,324,085 | B1 | * | 11/2001 | Kimura et al. ............ 363/132 |
| 6,326,750 | B1 | | 12/2001 | Marcinkiewicz |
| 6,351,106 | B1 | | 2/2002 | Kramer et al. |
| 6,567,283 | B1 | | 5/2003 | Welches ............... 363/89 |
| 6,654,261 | B1 | | 11/2003 | Welches ............... 363/41 |
| 6,690,593 | B1 | * | 2/2004 | Kimura et al. ............ 363/98 |

(Continued)

FOREIGN PATENT DOCUMENTS

GB    2 125 239    2/1984

OTHER PUBLICATIONS

Oriti et al., "A New Space Vector Modulation Strategy for Common Mode Voltage Reduction." Research Report 97-20, Wisconsin Power Electronics Research Center, 1997, pp. 1-6.

(Continued)

*Primary Examiner*—Bao Q. Vu
(74) *Attorney, Agent, or Firm*—Myers Bigel Sibley & Sajovec

(57) ABSTRACT

A power converter apparatus, such as a double-conversion or line-interactive UPS, includes first and second DC voltage busses and a polyphase DC to AC converter circuit coupled to the first and second DC voltage busses and operative to generate a polyphase AC output. The apparatus further includes a control circuit operatively associated with the polyphase DC to AC converter circuit and configured to shift a DC voltage range of the first and second DC voltage busses with respect to a reference voltage responsive to a relationship among phase components associated with the polyphase AC output. The components may include, for example, actual phase voltages or modulation commands (e.g., count values) from which the polyphase AC output is generated. The reference voltage may be a neutral voltage, e.g., a voltage of an actual neutral of a load receiving the AC output or a synthetic neutral voltage.

38 Claims, 12 Drawing Sheets

U.S. PATENT DOCUMENTS 6,909,620 B1 *   6/2005   Park et al. ................ 363/56.04
2003/0155893 A1   8/2003   Schreiber

OTHER PUBLICATIONS

Zhou et al., "Relationship Between Space-Vector Modulation and Three-Phase Carrier-Based PWM: A Comprehensive Analysis," IEEE Transactions on Industrial Electronics, vol. 49, No. 1, Feb. 2002, pp. 186-196.

International Search Report and Written Opinion of the International Searching Authority for International patent application No. PCT/US2005/002078 mailed on Jul. 6, 2005.

* cited by examiner

POWER CONVERSION APPARATUS AND METHODS USING DC BUS SHIFTING

BACKGROUND OF THE INVENTION

The present invention relates to power conversion apparatus and methods, and more particularly, to power conversion apparatus and methods in which a polyphase AC output is generated from a DC link.

Uninterruptible power supplies (UPSs) are commonly used to provide conditioned and/or auxiliary power to electronic equipment that provides critical functions, such as computer systems, telecommunications systems and medical equipment. Typically, UPSs can provide AC power from a backup source, such as a battery, generator or fuel cell, in the event that a utility power supply fails or becomes degraded.

Some UPS systems use an architecture in which an AC voltage is generated from a DC voltage on a DC link. As shown in FIG. 1, a typical conventional double-conversion UPS 100 includes a rectifier 110 that receives AC power from an AC power source 10, such as a utility grid. The rectifier 110 generates a DC voltage on a DC link 115. The UPS 100 further includes an inverter 120 that generates an AC output that is applied to a load 20 from the DC voltage on the DC link 115. The DC link 115 typically includes first and second busses, respective voltages of which are typically balanced on positive and negative sides of a neutral of the AC output. Backup or supplemental power may be provided via the DC link by an auxiliary DC power source 130, e.g., a battery.

FIG. 2 illustrates a conventional "line interactive" UPS architecture. A line-interactive UPS 200 includes an inverter/charger circuit 220 that is configured to be coupled to an AC source 10 and a load 20. The inverter/charger circuit 220 is operative to act as an inverter when the AC source 10 has failed or become degraded, generating an AC voltage to power the load 20 from an auxiliary power DC power source 230, e.g., a battery, coupled to the inverter/charger circuit 220 by a DC link 215. When the AC source 10 is in a normal state, the inverter/charger circuit 220 may act as a rectifier, supplying charging current to the auxiliary source 230 over the DC link 215. Similar to the double-conversion configuration of FIG. 1, the DC link 215 typically includes first and second busses, respective voltages of which are typically balanced on positive and negative sides of a neutral of the AC output/input.

SUMMARY OF THE INVENTION

According to some embodiments of the invention, a power converter apparatus, such as a UPS, includes first and second DC voltage busses and a polyphase DC to AC converter circuit coupled to the first and second DC voltage busses and operative to generate a polyphase AC output. The apparatus further includes a control circuit operatively associated with the polyphase DC to AC converter circuit and configured to shift a DC voltage range of the first and second DC voltage busses with respect to a reference voltage responsive to a relationship among phase components associated with the polyphase AC output. For example, the reference voltage may be a neutral voltage for the polyphase AC output, e.g., an actual neutral or a synthetic neutral voltage derived from the phases.

In some embodiments, the control circuit is configured to shift the DC voltage range of the first and second DC voltage busses with respect to the reference voltage responsive to phase voltages of the polyphase AC output. In other embodiments, the control circuit may be configured to shift the DC voltage range of the first and second DC voltage busses with respect to the reference voltage responsive to phase modulation commands (e.g., modulation counts) from which the polyphase AC output is generated. Such modulation commands may be phase regulator outputs, e.g., outputs from a regulator for a pulse width modulator that drives the polyphase AC output. According to further aspects of the invention, the polyphase DC to AC converter circuit includes respective half-bridge circuits that drive respective phases of the polyphase AC output. The control circuit is operative to provide discontinuous modulation of at least one of the half-bridge circuits.

In still further embodiments of the invention, the apparatus may include an AC to DC converter circuit operative to generate a DC voltage between the first and second DC voltage busses from an AC input. The control circuit may be operative to shift the DC voltage range between the first and second DC voltage busses responsive to a relationship among phase components associated with the AC input and the polyphase AC output. The control circuit may be further operative to regulate a DC voltage between the first and second DC voltage busses responsive to a relationship among the phase components associated with the AC input and the polyphase AC output.

In certain embodiments of the invention, the control circuit is operative to determine a maximum phase voltage and a minimum among the phase components associated with the AC input and/or the AC output, to regulate the DC voltage between the first and second DC voltage busses based on a difference between the determined maximum and minimum phase components, and to shift the DC voltage range between the first and second DC voltage busses with respect to the reference voltage based on relative magnitudes of the determined maximum and minimum phase components. The control circuit may be further operative to regulate the DC voltage between the first and second DC voltage busses such that the magnitude of the voltage between the first and second DC voltage busses is at least as great as the magnitude of the difference between the determined maximum and minimum phase components. The control circuit may also be operative to maintain relative magnitudes of voltages on the first and second DC voltage busses with respect to the neutral voltage in proportion to relative magnitudes of the maximum and minimum phase components. The control circuit may also be operative to conform voltages of the first and second DC voltage busses to an envelope defined by extrema of phase voltages at the AC input and/or the AC output.

In additional embodiments, the DC to AC converter circuit includes an inverter circuit operative to selectively couple the AC output to the first and second DC voltage busses responsive to an inverter control signal. The control circuit includes a control circuit operative to generate the inverter control signal responsive to the relationship among the phase components associated with the polyphase AC output. The inverter circuit may selectively couple the first and second DC voltage busses to the AC output responsive to a pulse width modulated control signal, and the control circuit may include a PWM count generator that generates a PWM count responsive to a voltage reference signal, a zero sequence offset generator that generates a zero sequence offset responsive to the relationship among the phase components associated with the polyphase AC output, and a PWM signal generator that offsets the PWM count according to the zero sequence offset and generates the pulse width modulated control signal from the offset PWM count.

The inverter circuit may include respective half-bridge circuits operative to selectively couple the first and second DC voltages busses to respective phases of the AC output responsive to respective pulse width modulated control signals. The PWM count generator may generate respective PWM counts for respective ones of the phases at the AC output responsive to the voltage reference signal, and the PWM signal generator may offset the PWM counts according to the zero sequence offset and generates the respective pulse width modulated control signals from the respective offset PWM counts. The pulse width modulated control signals may include first pulse width modulated control signals, the control circuit may include a neutral bridge circuit operative to selectively couple the first and second DC voltage busses to and from the neutral responsive to a second pulse width modulated control signal, and the PWM signal generator may generate the second pulse width modulated control signal from the offset PWM counts.

According to some method embodiments of the invention, in a polyphase power converter that is operative to generate a polyphase AC output from a DC voltage on a DC link including first and second DC voltage busses, a voltage range between the first and second DC voltage busses is shifted with respect to a reference voltage for the polyphase AC output responsive to a relationship among phase components associated with the polyphase AC output. The voltage range between the first and second DC voltage busses may be shifted with respect to the reference voltage responsive to a relationship among phase voltages of the polyphase AC output. The phase components may include phase modulation commands from which the polyphase AC output is generated.

DETAILED DESCRIPTION OF EXEMPLARY EMBODIMENTS

Figure 1:
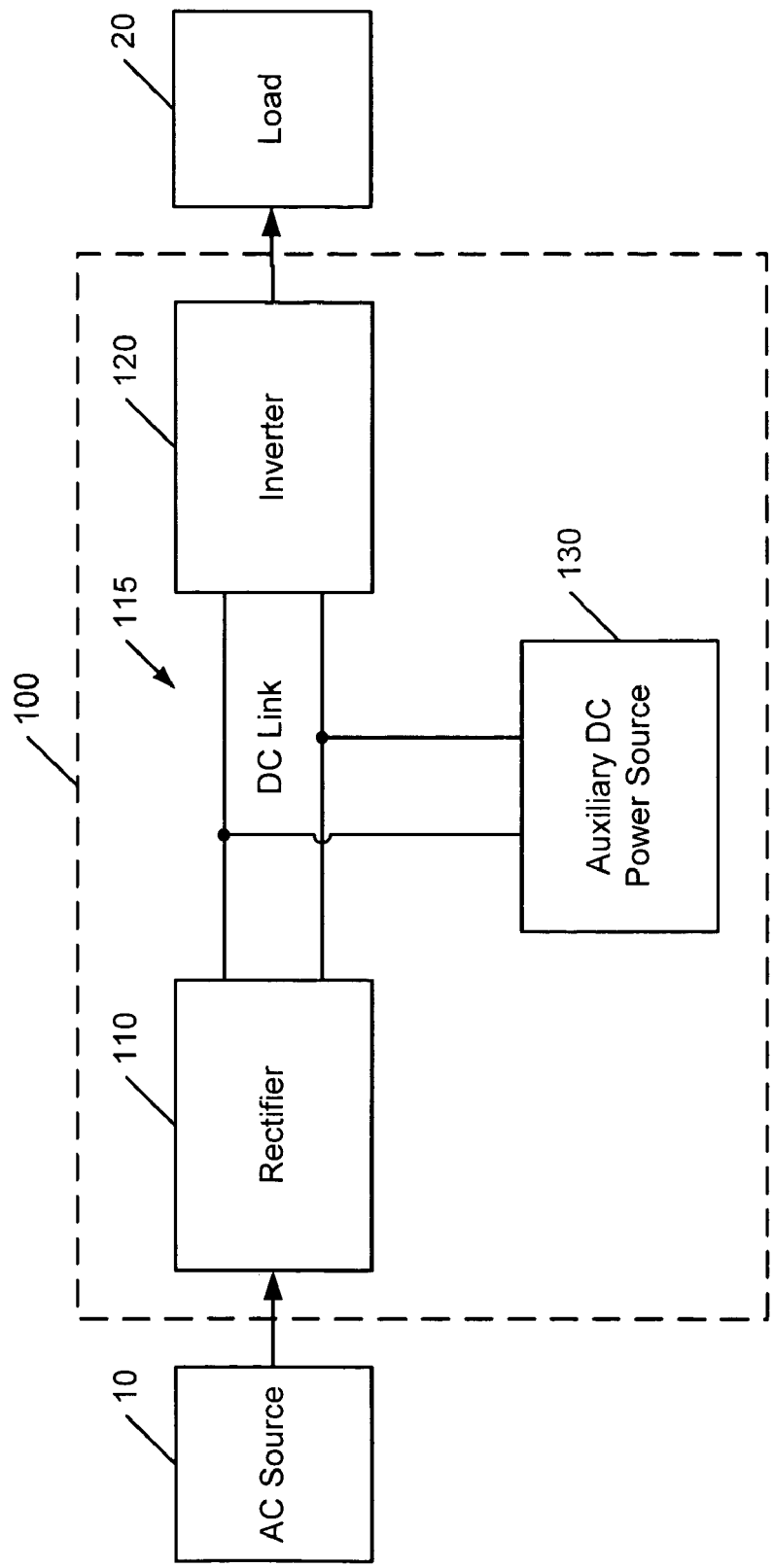
FIG. 1 is a schematic diagram illustrating a conventional double-conversion UPS.
Figure 2:
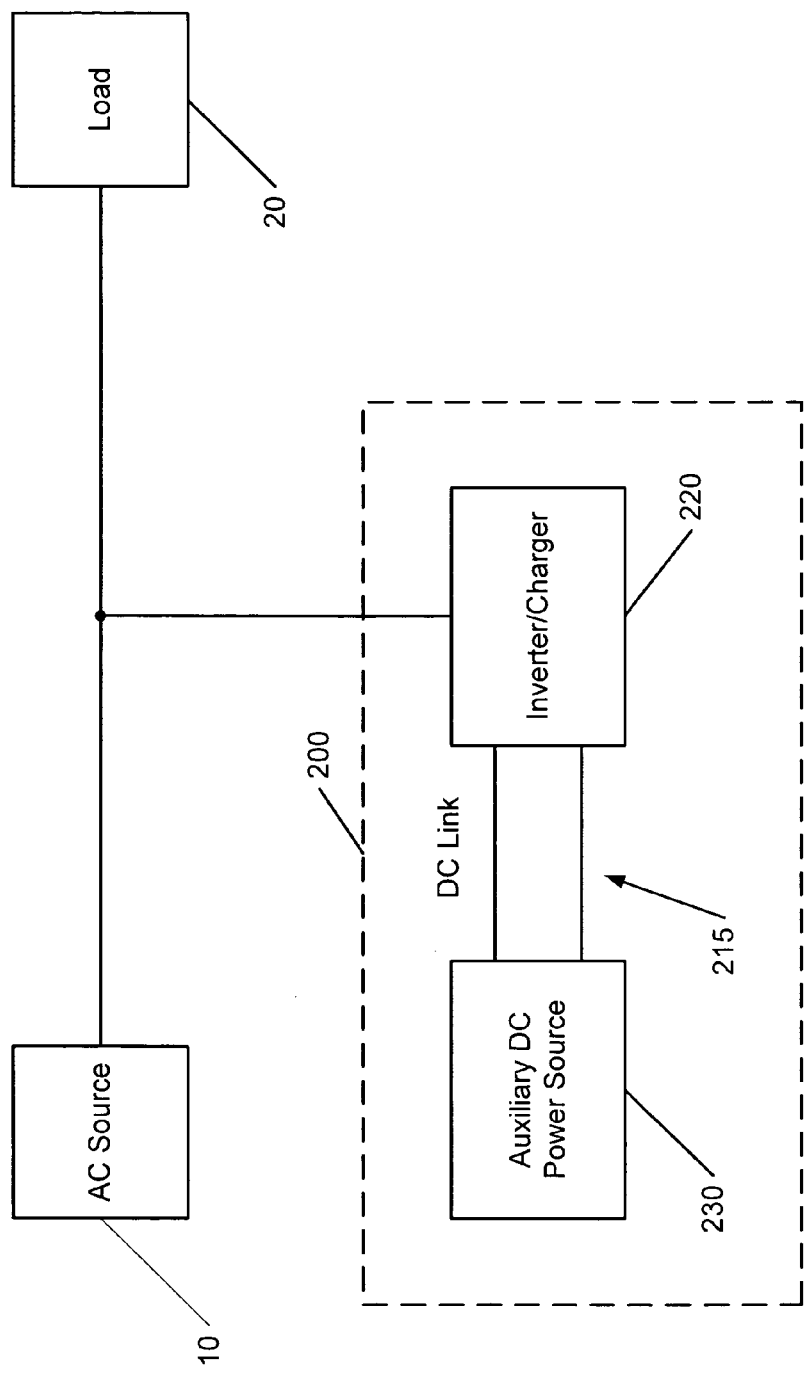
FIG. 2 is a schematic diagram illustrating a conventional line-interactive UPS.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present.

FIGS. 3–10 include block diagrams, flowcharts and waveform diagrams illustrating exemplary apparatus and methods according to various embodiments of the present invention. The items in these figures, and combinations thereof, may be implemented using one or more electronic circuits, for example, power electronics circuits, such as half-bridge circuits and drive circuits controlled by a processor such as a microprocessor or microcontroller. It will also be appreciated that, in general, operations depicted in the diagrams, and combinations thereof, may be implemented in one or more electronic circuits, such as in one or more discrete electronic components, one or more integrated circuits (ICs), one or more application specific integrated circuits (ASICs), and application specific circuit modules, as well as by computer program instructions which may be executed by a computer or other data processing apparatus, such as a microprocessor or digital signal processor (DSP), to produce a machine such that the instructions which execute on the computer or other programmable data processing apparatus create electronic circuits or other means that implement the specified operations. The computer program instructions may also be executed on one or more computers or other data processing apparatus to cause a series of actions to be performed by the computer(s) or other programmable apparatus to produce a computer implemented process that includes the specified operations. Accordingly, the block diagrams and flowcharts support electronic circuits and other apparatus that perform the specified operations, and acts for performing the specified operations. It will be appreciated that the blocks may represent functional groupings of circuitry and that, even if separate functional blocks are illustrated, the same circuitry may be used in implementing the functions of the separate blocks.

Figure 3:
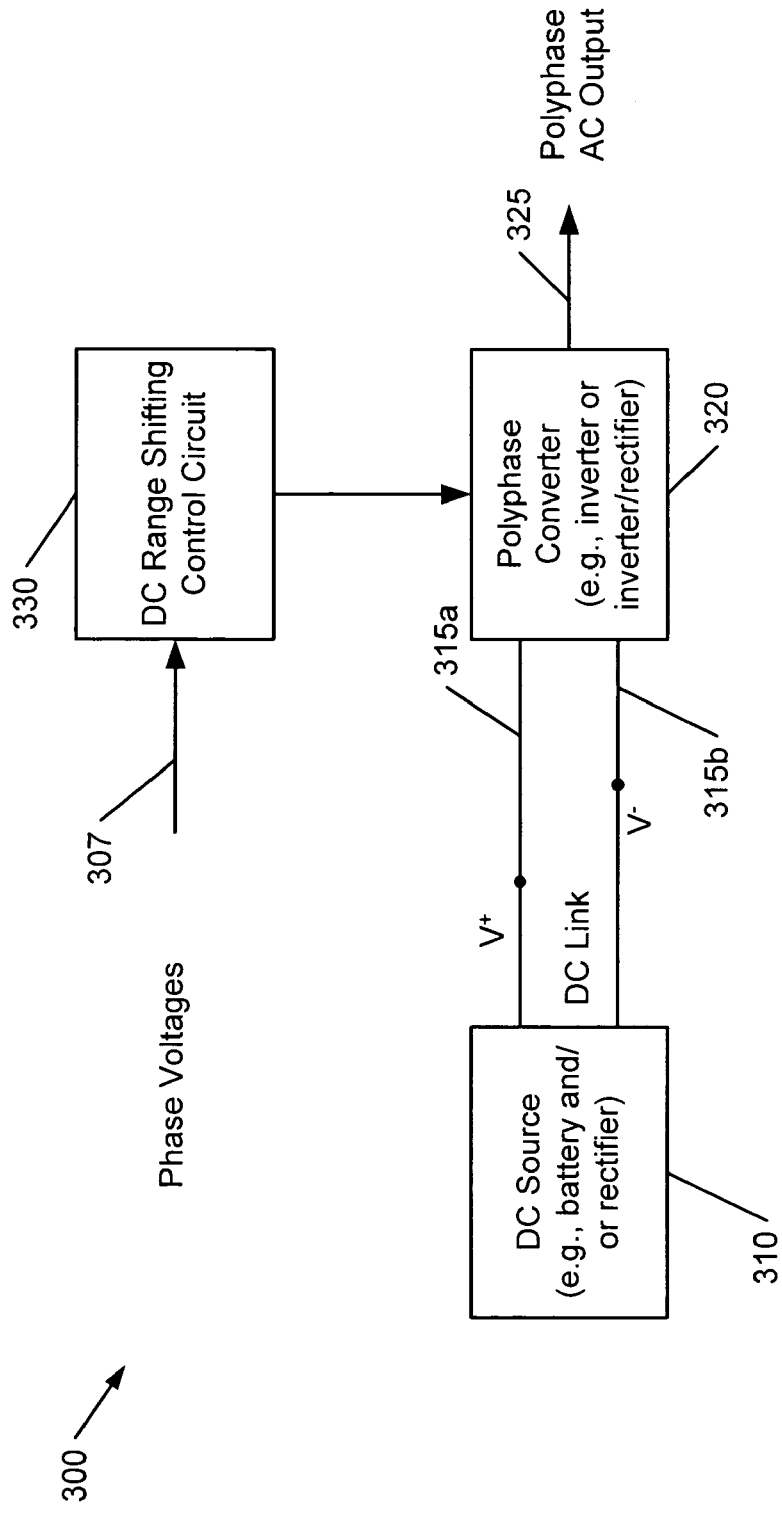
FIG. 3 is a schematic diagram illustrating a power conversion apparatus according to some embodiments of the invention.

A power conversion apparatus 300 according to some embodiments of the invention illustrated is illustrated in FIG. 3. In particular, the apparatus 300 includes a DC source 310 (e.g., a battery, rectifier, or other source) operative to generate first and second DC voltages $V^+$, $V^-$ on a DC link including first and second DC voltage busses 315a, 315b. The apparatus 300 further includes a polyphase DC to AC converter circuit, e.g., an inverter circuit 320, operative to generate a polyphase AC output 325 from the DC voltages $V^+$, $V^-$) on the DC busses 315a, 315b. The apparatus 300 further includes a DC range shifting control circuit 330 operative to shift a range of voltages $V^+$, $V^-$ on the DC voltage busses 315a, 315b with respect to a reference voltage, for example, a neutral voltage for the AC output 325. In particular, the DC range shifting control circuit 330 is operative to shift the range of voltage between the DC voltage busses 315a, 315b responsive to a relationship among phase components of the AC output 325.

It will be appreciated that the apparatus 300 may be implemented in a number of different ways and/or employed in any number of different applications. For example, the configuration illustrated in FIG. 3 is applicable to power conversion circuitry in both double conversion and line interactive UPSs. In such applications, the reference voltage used for the DC range shifting control circuit may be, for example, an actual load neutral (in "Y" connected output configurations) or a "synthetic" neutral computed from line-to-line voltages (in "delta" output configurations), and the DC range shifting control circuit 330 may be used to shift the voltage range spanned by the DC voltage busses 315a, 315b about the neutral (actual or synthetic). As described in further detail below, such a technique may be used to improve conversion efficiency and/or reduce switching component stress.

Figure 4:
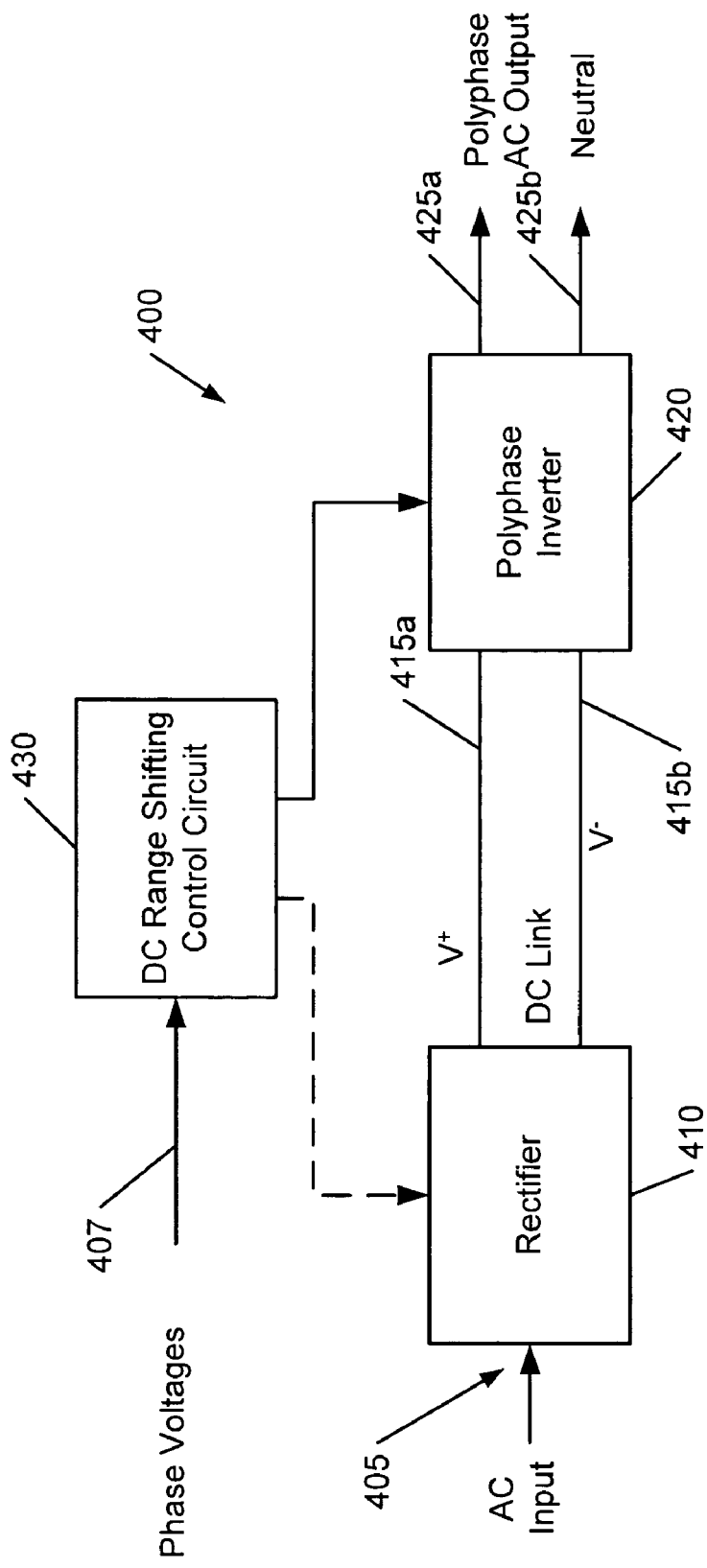
FIG. 4 is a schematic diagram illustrating a double conversion power conversion apparatus according to further embodiments of the invention.

An exemplary implementation for a double conversion architecture is illustrated in FIG. 4. As shown in FIG. 4, a power conversion apparatus 400 according to further embodiments of the invention includes a DC source in the form of a rectifier 405 that generates first and second DC voltages $V^+$, $V^-$ on a DC link including first and second DC voltage busses 415a, 415b from an AC input 405 (e.g., a utility power source). The apparatus 400 further includes a polyphase inverter 420 that produces a polyphase AC output 425a with respect to a neutral 425b. The inverter 420 is controlled by a DC range shifting control circuit 430, which is operative to shift the voltage range $V^+$, $V^-$ between the busses 415a, 415b with respect to the neutral 425b responsive to a relationship among phase voltages at the AC output 425a. As shown in dotted line and discussed in greater detail below, the control circuit 430 may be further operative to control a difference between the DC bus voltages $V^+$, $V^-$ generated by the rectifier 410 responsive to a relationship among the phase components 407 to provide an adequate DC voltage difference between the DC voltage busses 415a, 415b to support generation of a desired AC output. As discussed in further detail below, such control of the rectifier may be responsive to relationships among phase voltages at the AC input 405 and the AC output 425a.

Although FIG. 4 illustrates a converter topology suitable for a double-conversion UPS, it will be appreciated that the invention is applicable to a variety of other polyphase power conversion applications. For example, referring back to FIG. 3, in line-interactive UPS applications, the DC source 310 may be a battery and/or a combination of a battery and a DC—DC converter, rather than the rectifier 410 shown in FIG. 4. The converter 320 may include a polyphase rectifier/inverter circuit, i.e., a circuit that inverts a DC voltage produced by the DC source 310 to produce an AC voltage in a first mode and that rectifies an AC voltage at the AC output 325 to provide battery charging in a second mode.

Figure 5:
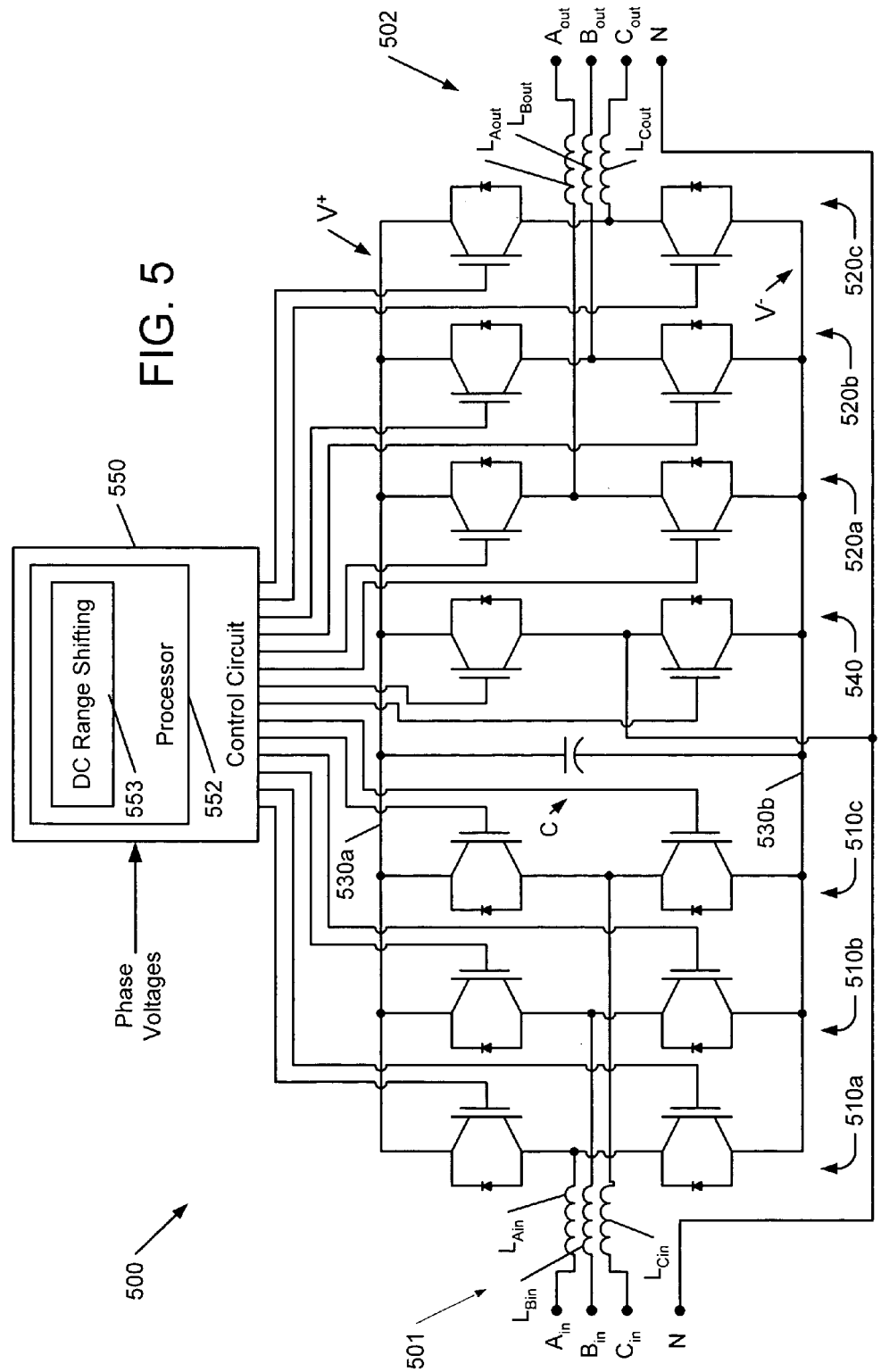
FIG. 5 is a schematic diagram illustrating a double-conversion power conversion apparatus according to further embodiments of the invention.

FIG. 5 illustrates a three-phase double conversion type power conversion apparatus 500 according to some embodiments of the present invention. The apparatus 500 includes a plurality of insulated gate bipolar transistor (IGBT) half-bridge circuits 510a, 510b, 510c that generate first and second DC voltages on first and second DC voltage busses 530a, 530b from a three-phase AC input 501 including phases $A_{in}$, $B_{in}$, $C_{in}$. The respective half-bridge circuits 510a, 510b, 510c are operative to selectively couple respective ones of the phases $A_{in}$, $B_{in}$, $C_{in}$ to the first and second DC voltage busses 530a, 530b via respective input inductors $L_{Ain}$, $L_{Bin}$, $L_{Cin}$ under control of a control circuit 550. The apparatus 500 further includes additional IGBT half-bridge circuits 520a, 520b, 520c that are operative, under control of the control circuit 550, to selectively couple respective output phases Acute $B_{out}$, $C_{out}$ of an AC output 502 to the first and second voltage busses 530a, 530b via respective output inductors $L_{Aout}$, $L_{Bout}$, $L_{Cout}$. An additional IGBT half-bridge circuit 540 may be provided to selectively couple a neutral N of the AC output 502 to the first and second voltage busses 530a, 530b.

The control circuit 550 includes a processor 552 in which a DC range shifting control circuit 553 is implemented using software and/or firmware that configures the processor to provide control of the half-bridge circuits 510a, 510b, 510c, 520a, 520b, 520c, 540. The control circuit 550 operates the half-bridge circuits 510a, 510b, 510c to regulate a DC voltage ($V^+$–$V^-$) between the first and second DC voltage busses 530a, 530b, and controls the half-bridge circuits 520a, 520b, 520c and, optionally, the additional half-bridge circuit 540, to shift the voltage range $V^+$ to $V^-$ with respect to the neutral N responsive to phase voltages of the input phases $A_{in}$, $B_{in}$, $C_{in}$ and the output phases $A_{out}$, $B_{out}$, $C_{out}$. Energy storage is provided by a capacitor 560 coupled to the first and second voltage busses 530a, 530b.

The minimum instantaneous voltage for the positive DC voltage bus 530a is approximately the maximum positive voltage on any of the input phases $A_{in}$, $B_{in}$, $C_{in}$ or output phases $A_{out}$, $B_{out}$, $C_{out}$ at that instant, due to the diodes in the IGBTs of the bridge circuits. Likewise, the minimum instantaneous negative DC voltage on the negative DC bus 530b is approximately the minimum (i.e., the most negative) voltage of any of the input phases $A_{in}$, $B_{in}$, $C_{in}$ or output phases $A_{out}$, $B_{out}$, $C_{out}$. The minimum DC voltage ($V^+$–$V^-$) between the first and second DC voltage busses 530a, 530b needed to operate, therefore, is at least as great as the maximum positive phase voltage minus the maximum negative phase voltage.

The processor 552 preferably includes a relatively high-speed digital control processor, such as a digital signal processor (DSP) controller, that samples the voltages $V^+$, $V^-$ on the DC busses 530a, 530b, as well as phase voltages on the input phases $A_{in}$, $B_{in}$, $C_{in}$ and the output phases $A_{out}$, $B_{out}$, $C_{out}$ and the voltage on the neutral N (for reference). The control circuit 550 may use this sampled information to produce a linear and balanced load at the AC input 501 and to deliver a substantially distortion-free three-phase source at the output 502. FIG. 5 may be viewed as a 7-pole (6-pole, if the neutral is not switched) machine, with a first three poles (310a, 310b, 310c) forming a rectifier that creates a DC voltage from an AC voltage. Those skilled in the art will appreciate that some embodiments of the invention may be limited to operation of the 4-pole output (320a, 320b, 320c) with a conventional DC source, such as a battery.

Figure 6:
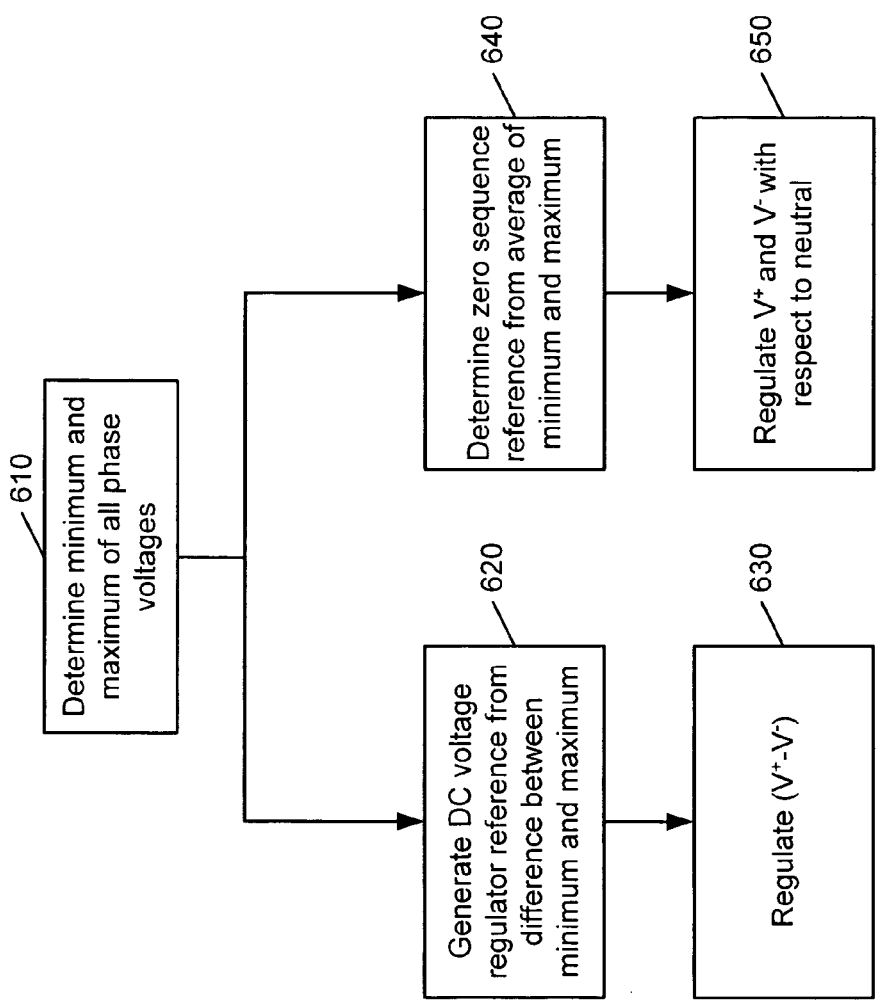
FIG. 6 is a flowchart illustrating exemplary operations for regulating a DC link in a power conversion apparatus according to some embodiments of the invention.

Some embodiments of the invention arise from a realization that creating both a DC voltage reference for regulation of the DC voltage ($V^+$–$V^-$) between the first and second DC voltage busses 530a, 530b and a "zero sequence" reference for regulation of the phase voltages at the AC output 502 to provide a shifting or modulation of the range spanned by the DC voltages $V^+$, $V^-$ with respect to the AC output neutral that can improve conversion efficiency and/or reduce voltage stress. Referring to FIG. 6, the control circuit 550 may determine maximum voltage and the minimum phase voltages (e.g., instantaneous or near-instantaneous voltages) among the phase voltages of the input phases $A_{in}$, $B_{in}$, $C_{in}$ and the output phases $A_{out}$, $B_{out}$, $C_{out}$ (block 610). The phase voltage information for the output phases $A_{out}$, $B_{out}$, $C_{out}$ may be obtained by directly sampling (e.g., using an analog to digital converter) the phase voltages and/or by using reference voltage vectors used to produce the output phase voltages. The difference between the minimum and maximum phase voltages may be used to generate a voltage reference for regulating the DC voltage ($V^+-V^-$) between the DC busses, i.e., such that the magnitude of the DC voltage ($V^+-V^-$) is at least as great as the magnitude of the difference between the minimum and maximum phase voltages (blocks 620, 630). This DC voltage reference may be peak filtered (i.e., averaged over time).

The average of the minimum and maximum phase voltages may be used to generate a zero sequence (common mode) reference that is used to regulate the DC bus voltages V+ and V− with respect to the neutral N, i.e., the zero sequence reference may be used as a reference vector that may be added to the other reference vectors for regulating the output phases $A_{out}$, $B_{out}$, $C_{out}$ (blocks 640, 650). In this manner, the relative magnitudes of the DC voltages $V^+$, $V^-$ can be maintained substantially in proportion to the relative magnitudes of the minimum and maximum phase voltages. It will be understood that the zero sequence reference may be such that one pole of a polyphase converter need not switch (discontinuous modulation).

Figure 7:
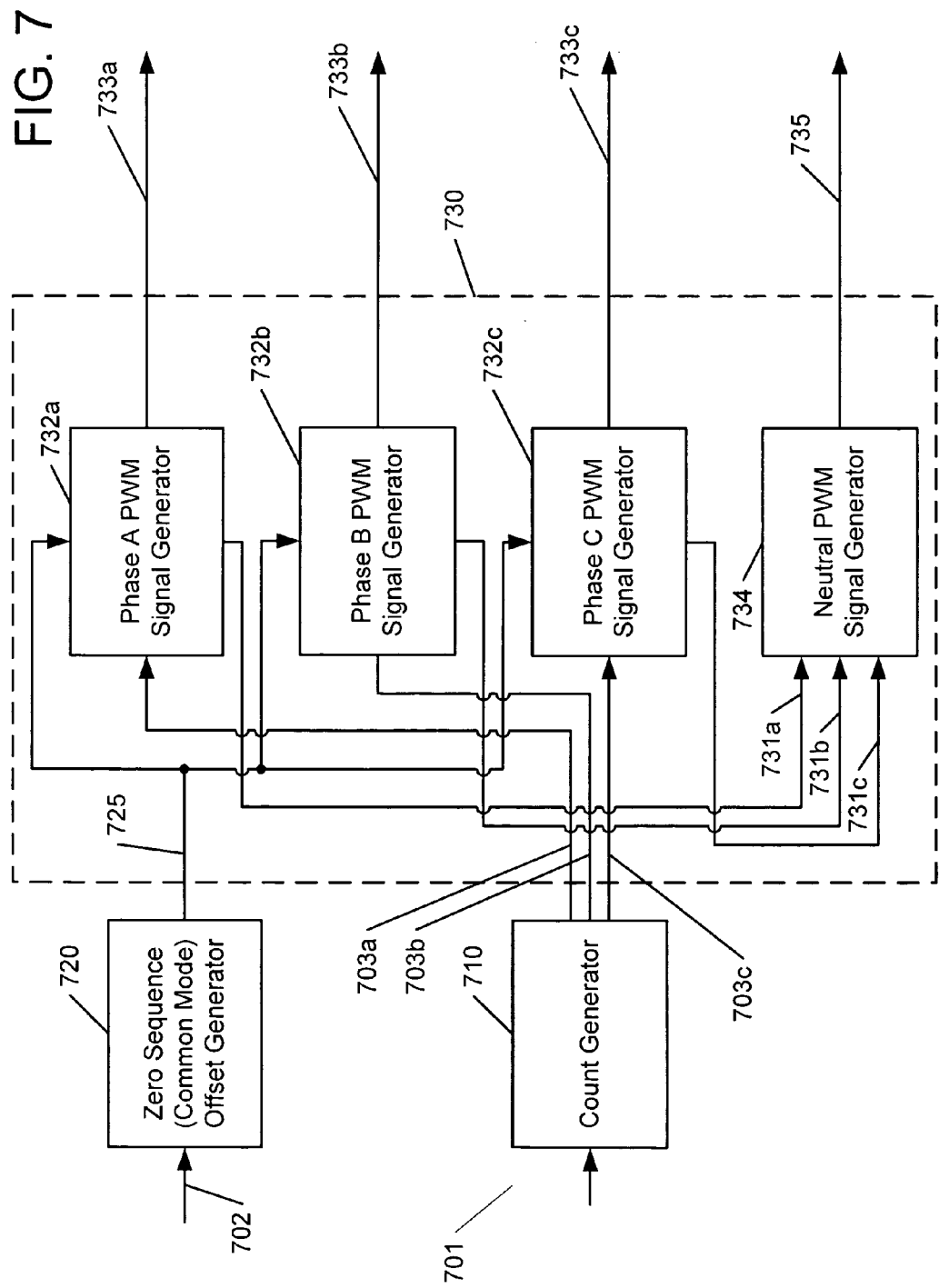
FIG. 7 is a schematic diagram illustrating an exemplary control loop architecture for a power conversion apparatus according to further embodiments of the invention.

FIG. 7 illustrates an exemplary manner in which such a zero-sequence reference may be used in a three-phase power converter, such as the converter 500 of FIG. 5, according to some embodiments of the present invention. In particular, the converter 500 may include a PWM signal generator circuit 730 having respective PWM signal generator circuits 732*a*, 732*b*, 732*c* that generate pulse width modulated control signals 733*a*, 733*b*, 733*c* for driving the respective output half-bridge circuits 520*a*, 520*b*, 520*c*. The PWM signal generator circuits 732*a*, 732*b*, 732*c* receive respective counts 703*a*, 703*b*, 703*c* from a count generator circuit 710, which generates the counts 703*a*, 703*b*, 703*c* responsive to a reference signal 701. For example, the reference signal 701 may include a sine wave reference that is indicative of a desired voltage for the AC output, and the counts 703*a*, 703*b*, 703*c* may be representative of a PWM switch duration (duty cycle) for producing the desired output voltage.

The counts 707*a*, 707*b*, 707*c* are offset in the PWM signal generators 732*a*, 732*b*, 732*c* according to a zero-sequence offset 725 generated by zero sequence offset generator 720 responsive to a zero sequence reference signal 702. The PWM signal generators 732*a*, 732*b*, 732*c* generate offset counts 731*a*, 731*b*, 731*c* from which the respective pulse width modulated control signals 737*a*, 737*b*, 737*c* are generated. The net result of applying such offsets to each of the A, B, and C phase PWM circuits is to introduce a zero-sequence component that effectively modulates the DC voltage busses 330*a*, 330*b* of the converter 300 relative to the load side neutral (which may be an actual neutral or a synthetic neutral derived from line-line voltages).

As further shown in FIG. 7, if an actual neutral is present, the offset counts 731*a*, 731*b*, 731*c* for the three phases may also be provided to a neutral PWM signal generator 734. The neutral PWM signal generator 734 responsively generates a pulse width modulated control signal 735 for driving the neutral half-bridge circuit 540 of FIG. 5. In particular, the neutral PWM signal generator 734 may compute a vector average of the three offset phase counts 731*a*, 731*b*, 731*c* to generate a neutral count from which the pulse width modulated control signal 735 may be generated.

Figure 8:
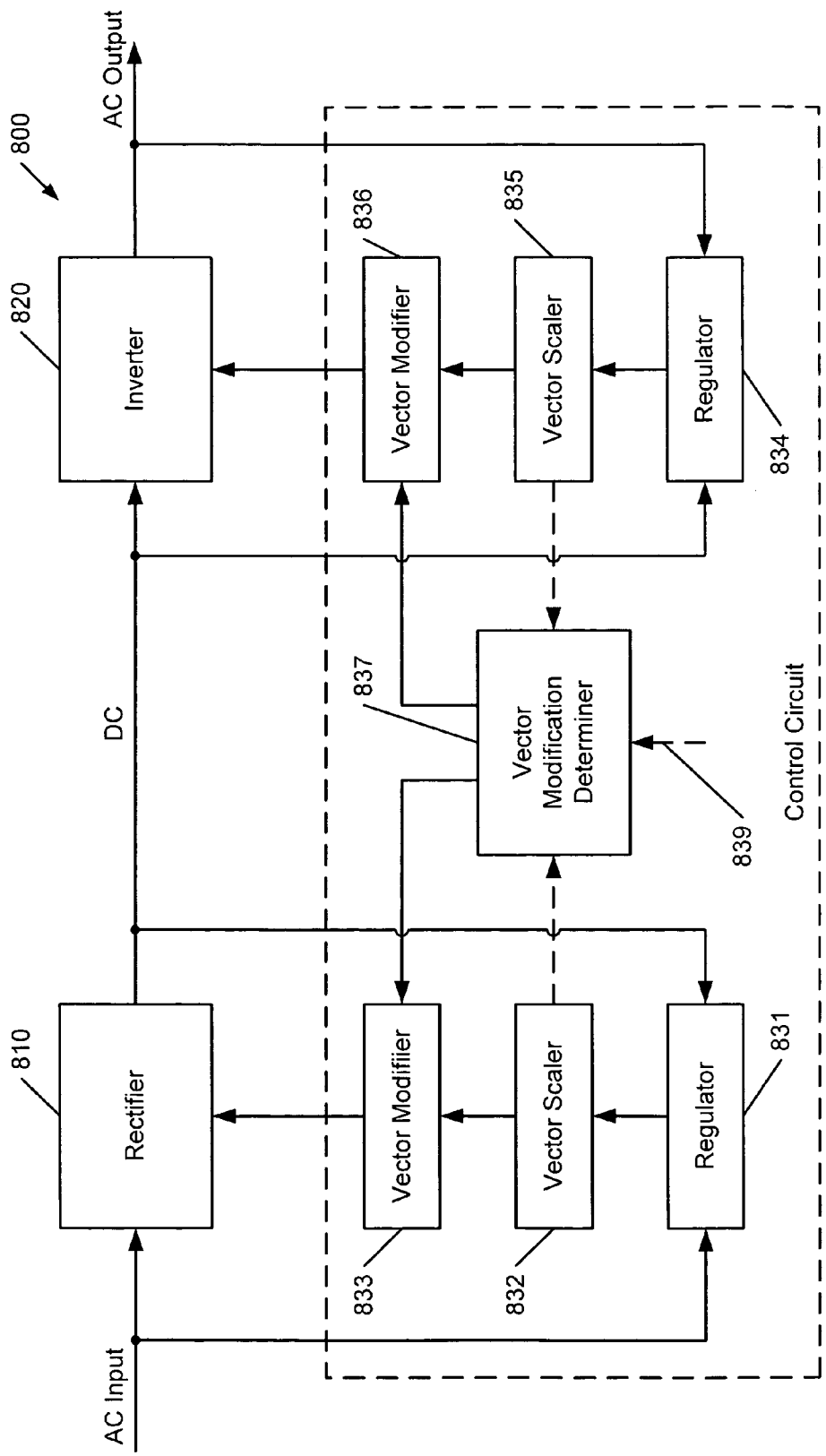
FIG. 8 is a schematic diagram illustrating and exemplary control architecture for a power conversion apparatus according to further embodiments of the present invention.

FIG. 8 illustrates an exemplary control configuration of a power conversion apparatus according to further embodiments of the invention. The apparatus includes a rectifier 810 and a polyphase inverter 820 linked by a DC link 815 and controlled by a control circuit 830. As shown, the rectifier 810 may include switching components, such as IGBT half-bridges, as well as circuitry for generating drive signals for such switching components.

The control circuit 830 includes a first regulator 831 that controls a DC output voltage produced by the rectifier 810. In particular, the first regulator 831 generates a command vector for controlling the rectifier 810 based on the voltage on the DC link 815, e.g., a command vector for controlling the rectifier to provide a desired voltage on the DC link 815. A vector scaler 832 scales this command vector to a control space (e.g., a PWM count range) of the rectifier 810. A vector modification determiner 837 determines a zero sequence (or common mode) offset. The offset is applied to the scaled command vector in a vector modifier 833 to provide a modified command vector for operation of a PWM converter in the rectifier 810.

A similar architecture is used to control the polyphase inverter 820. In particular, the control circuit 830 further includes a second regulator 834 that is operative to generate a command vector responsive to voltage on the DC link 815 and at the AC output of the polyphase inverter 820. This command vector is scaled to a PWM space by a vector scaler 835. The vector modification determiner 837 determines an appropriate offset to apply to the scaled command vector to achieve a desired shifting of a DC voltage range of the DC link 815. This offset is applied in a vector modifier 836 to provide a modified PWM command vector for the polyphase inverter 820. If the rectifier and inverter share a common reference, e.g., a common neutral or ground, they should have a substantially identical zero sequence.

It will be appreciated that the various blocks of the control circuit 830 may be implemented as software objects, routines, modules or the like, executing on a control processor, such as a DSP-based microcontroller. It will be further appreciated that the rectifier side of the control circuit 830, i.e., the regulator 831, scaler 831, and modifier 833 may be replaced with a more conventional rectifier architecture which is designed to provide sufficient voltage span for the link 815 to support the DC range shifting effected by the inverter side of the control circuit 830.

In some embodiments of the invention, the zero sequence offset may be determined responsive to the actual AC output and input. For example, along lines described above, the offset may be determined from an analysis of input and output phase voltages. For example, as shown in dashed line in FIG. 8, the vector modification determiner 837 could determine the zero sequence offset directly from phase voltages 839. Alternatively, as also shown in dashed line in FIG. 8, a zero sequence offset may be determined from the vectors generated by the vector scalers 832, 853, which generate scaled vectors responsive to phase voltages by virtue of the action of the regulators 831, 834. Although the embodiments in FIG. 8 illustrate a closed-loop determination of a zero sequence component, in further embodiments of the invention, e.g., non-closed loop applications, scaled vectors generated without such feedback content, e.g., vectors that are simply open loop commands to pulse width modulators, could be used to generate zero sequence offsets.

In certain embodiments of the invention, DC bus shifting may be achieved by determining and applying a zero sequence offsets completely in a "modulation domain." Referring to FIG. 8, for example, a count generator may used to generate counts for modulators that control respective phases of the rectifier 810 and the inverter 820, i.e., modulators that drive respective half-bridge circuits for respective phases of the rectifier 810 and inverter 820. Such a modulator may include an up-down counter that runs continuously to produce a digital approximation of a sawtooth wave, e.g., a counter that counts up from 0 to 1000 and then down from 1000 to 0, and so on. A digital controller provides a value (e.g., a value between 0 and 1000) to the modulator. When the counter in the modulator counts up to the provided value, the modulator causes a first transistor of a half-bridge circuit (e.g., the one coupled to a positive DC bus) to turn off and a second transistor of the half-bridge circuit (e.g., the one coupled to a negative DC bus) to turn on. Conversely, when the counter is counting down and reaches the provided value, the modulator turns off the second transistor and turns on the first transistor.

As an illustrative example of how embodiments of the invention may be implemented in such a modulation domain, suppose that 333 volts DC is available between positive and negative DC busses of a power converter, such as a UPS, and that the controller determines that the phase voltages with respect to neutral are as shown in Table I:

TABLE I

| Phase | Ain | Bin | Cin | Aout | Bout | Cout |
|---|---|---|---|---|---|---|
| Voltage | 185.5 | −112.6 | −72.9 | 168.7 | −102.4 | −66.2 |

Assuming the 333-volt DC space corresponds to the modulation count space of 0 to 1000, the voltages in Table I scale to the count values in Table II:

TABLE II

| Phase | Ain | Bin | Cin | Aout | Bout | Cout |
|---|---|---|---|---|---|---|
| Value | 1057 | 162 | 281 | 1007 | 192 | 301 |

It may be noted that the average of the voltages in Table I is zero and the average of the count values in Table II is 500 and that, although two of the count values lie outside of the range from 0 to 1000, the difference between the maximum and minimum count values (895) fits into the count range, i.e., the available voltage space. These scaled count values, rather than actual phase voltages, may be used to determine a zero sequence offset according to some embodiments of the invention.

The average of the maximum and minimum count values in Table II is 609, which differs from the average value of 500 by 109. Subtracting this difference from the values in Table II yields the values in Table III:

TABLE III

| Phase | Ain | Bin | Cin | Aout | Bout | Cout |
|---|---|---|---|---|---|---|
| Value | 948 | 52 | 172 | 898 | 83 | 192 |

These values may be provided to the respective phase modulators for the rectifier 810 and inverter 820. A neutral modulator, i.e., a modulator that drives a half-bridge circuit that selectively couples the positive and negative DC busses to the neutral, may be provided with a count of 500−109=391. Such a process would be repeated for every instance that new values are provided to the modulators.

It is generally desirable to regulate the DC bus voltage such that it is a bit higher than the absolute minimum required, such that transients and/or non-linear disturbances may be withstood. Thus, for the example given, it may be determined that the average difference between maximum and minimum count values corresponding to a period of the AC waveform is 900. To provide "headroom" of 100 in the modulation space, the DC regulator could be commanded to provide a DC voltage between the positive and negative DC busses corresponding to a count of 1000.

According to further embodiments of the invention, such modulation techniques may be modified to provide discontinuous modulation. In the preceding example, the difference between the maximum and minimum count values was 895 and the average of the minimum and maximum count values was 609. This resulted in an offset of 109, which was the value subtracted from all of the phases. According to other embodiments, the count values may be offset such that one of the values corresponds to the maximum count (1000), i.e., each of the count values of Table 1 are offset by the amount (57) that the maximum (1057) exceeds 1000, yielding the values in Table IV:

TABLE IV

| Phase | Ain | Bin | Cin | Aout | Bout | Cout | Neutral |
|---|---|---|---|---|---|---|---|
| Value | 1000 | 105 | 224 | 950 | 135 | 244 | 443 |

Thus, for the given set of values, one phase is held continuously to one of the DC voltage busses, providing discontinuous modulation. This can result in some reduction of switching losses in comparison to the preceding approach.

Figure 9A:
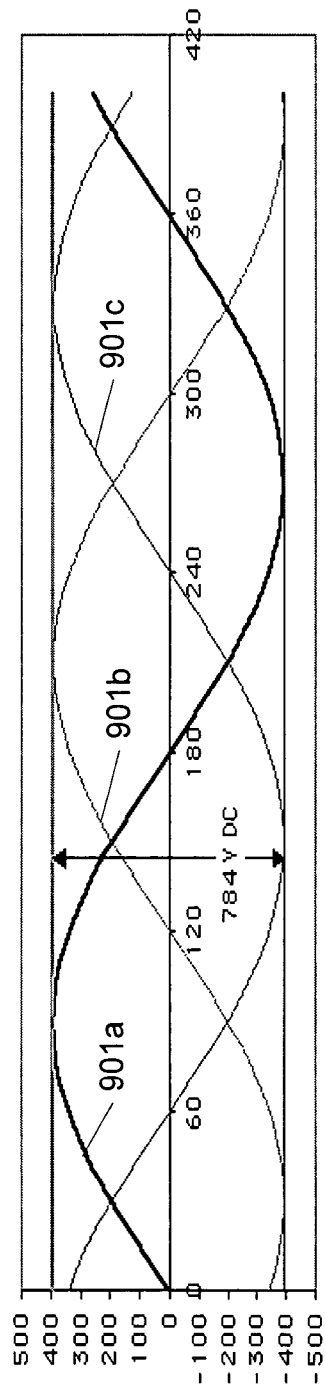
FIGS. 9A–9E are graphs illustrating simulated power conversion operations according to further embodiments of the invention in comparison to simulated operations of a conventional power converter.

FIG. 9A illustrates simulated voltage waveforms for a conventional transformerless 480/277 volt Y to 480/227 Y power converter, while FIGS. 9B–9E illustrate waveforms for a three phase converter according to some embodiments of the invention under various input and output conditions. As shown in FIG. 9A, the conventional converter maintains a relatively constant DC bus voltage levels with respect to the output neutral, under conditions in which a three-phase AC voltage 900a, 900b, 900c input to the converter is substantially the same as the regulated output voltage (not shown for purposes of clarity). For the example shown, the DC voltage between the positive and negative DC busses is around 784 volts.

Figure 9B:
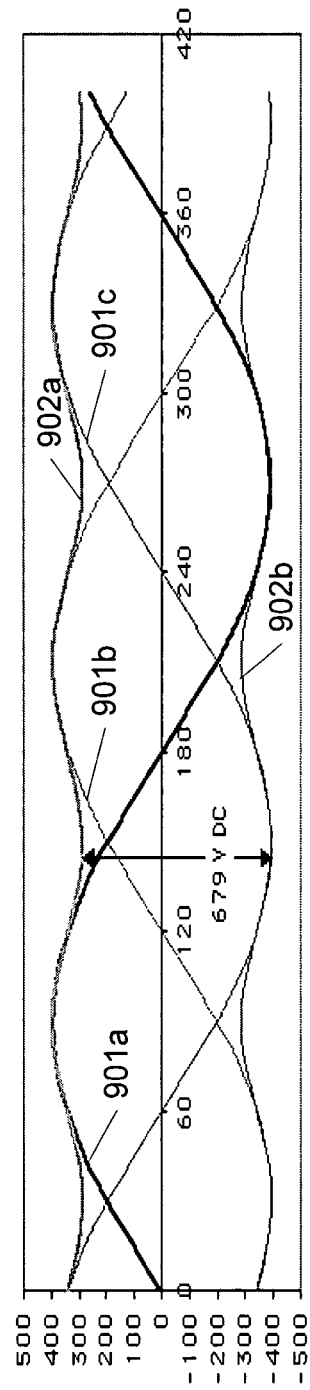
Figure 9C:
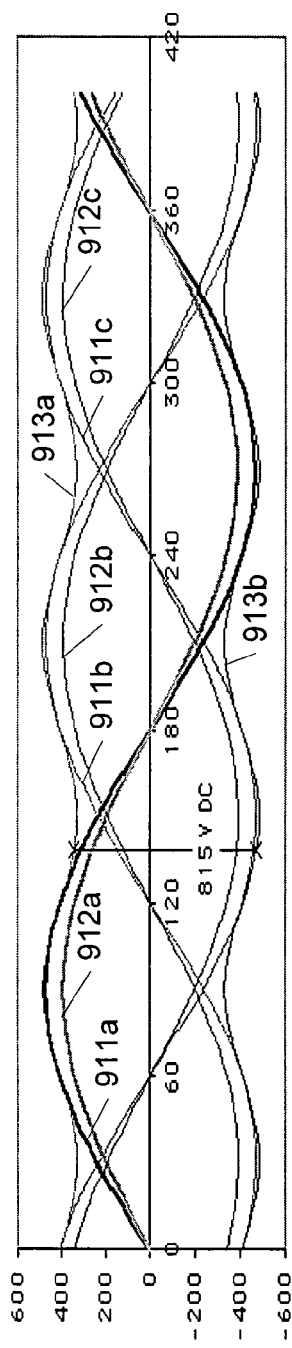
Figure 9D:
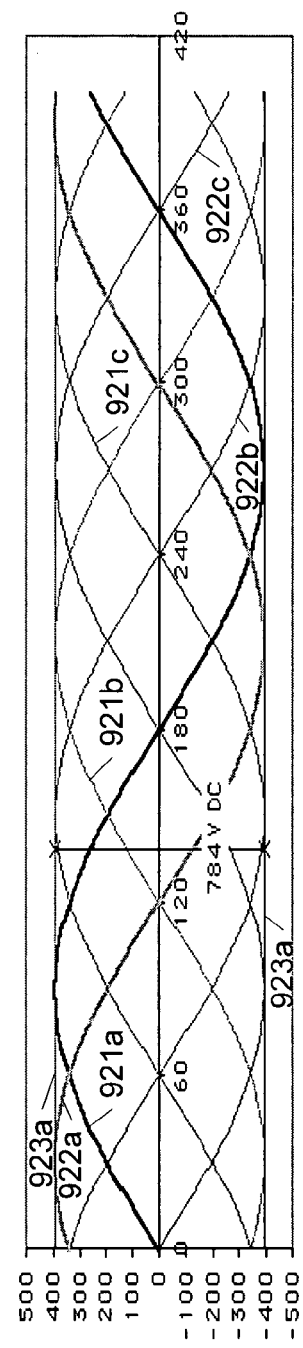

FIG. 9B shows simulated voltage waveforms for a transformerless 480/277 volt Y to 480/227 Y power converter according to embodiments of the invention configured along the lines of the converter 500 of FIG. 5, under conditions in which a three-phase AC voltage 901a, 901b, 901c input to the converter is substantially the same as the regulated output voltage (not shown for purposes of clarity), i.e., the input/output port conditions of FIG. 9A. Under these conditions, the converter according to embodiments of the invention modulates the DC bus voltages 902a, 902b with respect to the output neutral (the "0" volts axis) such that the difference between the DC bus voltages 902a, 902b may be reduced to around 680 volts and such that the DC bus voltages 902a, 902b substantially conform to an envelope defined by the positive and negative extrema of the input/output voltages 901a, 901b, 901c. It will be appreciated that, as used herein, "conforming" to extrema includes exact conformance, as well as conformance with a predetermined margin or "headroom." FIG. 9C illustrates a simulated "high line" condition for the same converter according to embodiments of the invention in which the input phase voltages 911a, 911b, 911c are around 20% higher than the output phase voltages 912a, 912b, 912c. As shown, the difference between the positive and negative DC voltages 917a, 914a increases to around 815 volts, which is still smaller than would be the case in a typical conventional system. FIG. 9D illustrates a condition in which the input phase voltages 921a, 921b, 921c and the output phase voltages 922a, 922b, 922c have substantially the same magnitude but are shifted in phase (around 60°) with respect to one another. This leads the difference between the positive and negative DC bus voltages 927a, 923b to be around 784 volts. Finally, FIG. 9E illustrates a condition for the same converter in which in which the input phase voltages 931a, 931b, 931c are around 20% greater than the output phase voltages 932a, 932b, 932c and are shifted in phase around 60°, leading to a difference between the positive and negative DC bus voltages 937a, 933b of around 862 volts.

Table V summarizes differences between the converter of the above-described embodiments of the invention illustrated in FIGS. 9B–9E and the conventional converter of FIG. 9A:

TABLE V

Figure 9E:
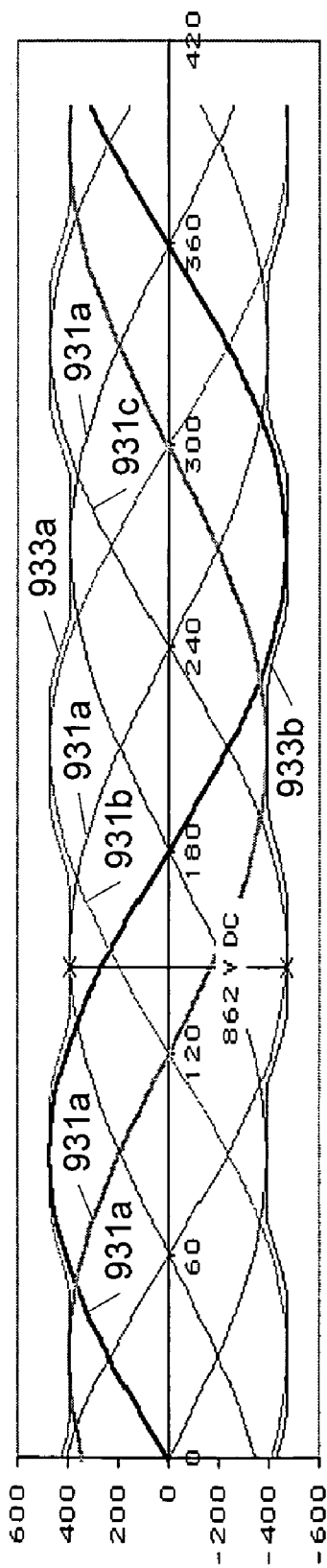

| Case | Inventive Converter | Conventional Converter | Reduction |
|---|---|---|---|
| FIG. 9B (Nominal) | 679 | 784 | 13.4% |
| FIG. 9C (High Line) | 815 | 941 | 13.4% |
| FIG. 9D (Phase Shift) | 784 | 784 | 0% |
| FIG. 9E (High Line & Phase Shift) | 862 | 941 | 8.3% |

The highest minimum DC voltage requirements are in the high line cases. The 20% high line used for this example may only be a transient condition, but converters according to some embodiments of the invention may exhibit an improved survivability in the face of such transients. According to further aspects of the invention, the required minimum DC for the phase shift cases can be further reduced by lowering the output voltage during such transient conditions. For example, in the exemplary converter of FIGS. 9B–9E, a reduction of 5% in the output voltage for the FIG. 9D and 9E cases can drop the minimum DC bus voltage about 20 volts, i.e., to 764 and 843 volts, respectively.

Figure 10:
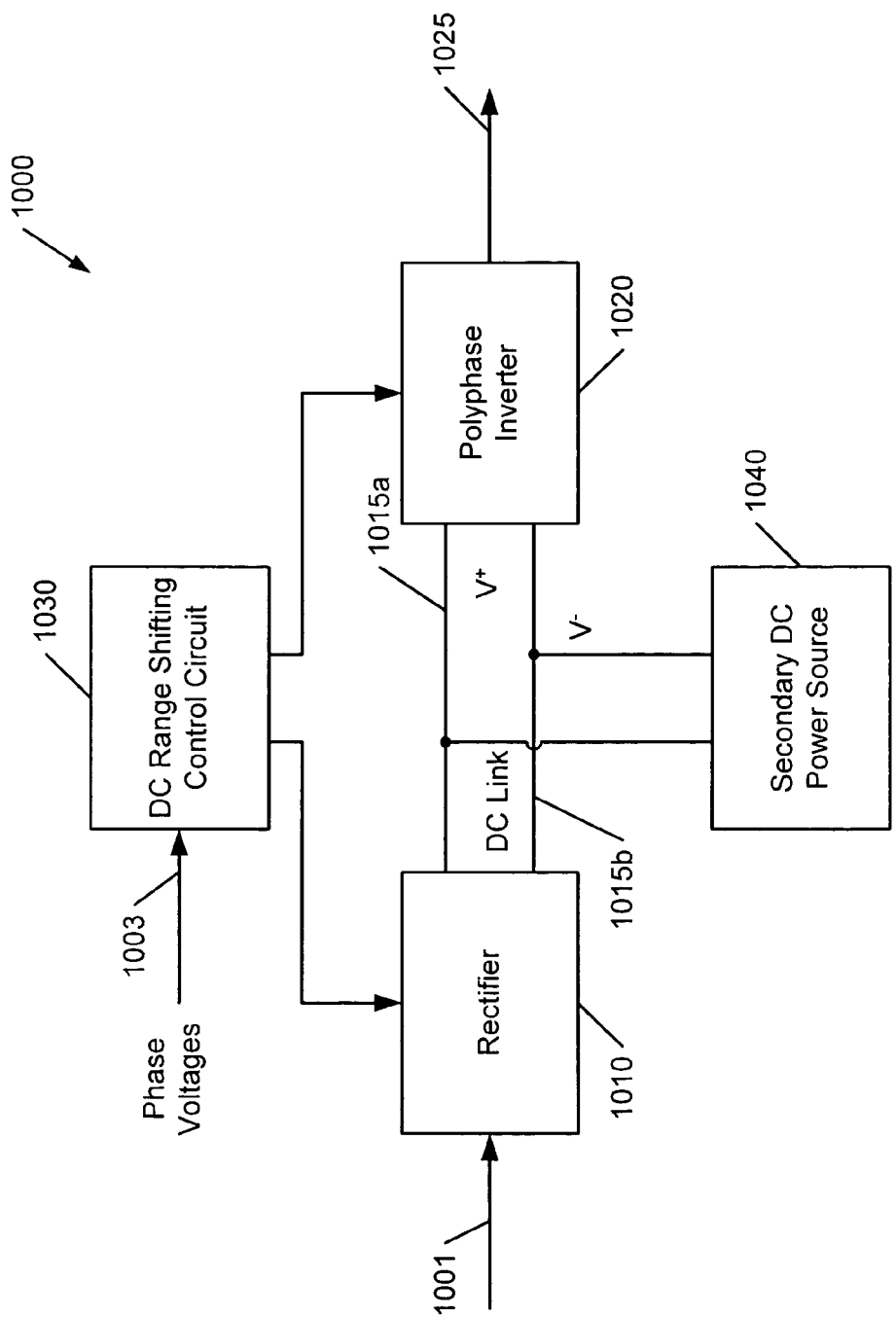
FIG. 10 is a schematic diagram illustrating an exemplary UPS according to further embodiments of the invention.

FIG. 10 illustrates an exemplary double-conversion UPS 1000 according to further embodiments of the present invention. The UPS 1000 includes an AC input 1001 and an AC output 1002. The UPS 1000 further includes a rectifier circuit 1010 coupled to the AC input port 1001 and operative to generate first and second DC voltages V⁺, V⁻ on first and second DC voltage busses 1015a, 1015b responsive to the phase voltages 1003 at the input and output ports 1001, 1002 as described above, e.g., based on minimum and maximum values thereof. The UPS 1000 also includes a polyphase inverter circuit 1020 coupled to the DC voltage busses 1015a, 1015b and operative to generate an AC voltage at a first terminal 1025a of the AC output port 1002 with respect to a neutral at a second terminal 1025b of the output port 1002. The UPS 1000 also includes a secondary DC power source 1040 coupled to the DC voltage busses 1015a, 1015b and operative to provide power thereto. The UPS 1000 further includes a DC bus modulator circuit 1030 coupled to the DC voltage busses 1015a, 1015b and operative to modulate the DC bus voltages V⁺, V⁻ with respect to the neutral (which may be tied to the input port 1001 as well) responsive to the phase voltages at the input and output ports 1001, 1002. It will be appreciated that the DC bus modulator circuit 1030 may effect operations along the lines described above. It will be further appreciated that, although shown as a separate functional block in FIG. 10, the DC bus modulator circuit 1030 may, in actual implementations, include components in common with the rectifier circuit 1010 and/or the polyphase circuit 1020, and may further include components for selectively connecting the DC busses 1015a, 1015b to the neutral to effect a desired zero sequence component, such as the half-bridge circuit 340 shown in FIG. 3. It will also be appreciated that, although FIG. 10 illustrates a double conversion architecture, the invention is equally applicable to other UPS configurations, including line interactive implementations.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed:

1. A power converter apparatus, comprising:
   first and second DC voltage busses;
   a polyphase DC to AC converter circuit coupled to the first and second DC voltage busses and operative to generate a polyphase AC output; and
   a control circuit operatively associated with the polyphase DC to AC converter circuit and configured to shift a voltage range of the first and second DC voltage busses with respect to a reference voltage responsive to a relationship among phase components associated with the polyphase AC output.

2. An apparatus according to claim 1, wherein the reference voltage comprises a neutral voltage for the polyphase AC output.

3. An apparatus according to claim 2, wherein the AC output includes a neutral terminal configured to be connected to a load connected to the AC output, and wherein the neutral voltage comprises a voltage at the neutral terminal.

4. An apparatus according to claim 2, wherein the neutral voltage comprises a synthetic neutral voltage.

5. An apparatus according to claim 1, wherein the control circuit is configured to shift the DC voltage range of the first and second DC voltage busses with respect to the reference voltage responsive to phase voltages of the polyphase AC output.

6. An apparatus according to claim 1, wherein the control circuit is configured to shift the DC voltage range of the first and second DC voltage busses with respect to the reference voltage responsive to phase modulation commands from which the polyphase AC output is generated.

7. An apparatus according to claim 6, wherein the phase modulation commands comprise respective phase regulator outputs.

8. An apparatus according to claim 1, wherein the polyphase DC to AC converter circuit comprises respective half-bridge circuits that drive respective phases of the polyphase AC output, and wherein the control circuit is operative to provide discontinuous modulation of at least one of the half-bridge circuits.

9. An apparatus according to claim 1, further comprising an AC to DC converter circuit operative to generate a DC voltage between the first and second DC voltage busses from an AC input.

10. An apparatus according to claim 9, wherein the control circuit is operative to shift the DC voltage range between the first and second DC voltage busses responsive to a relationship among phase components associated with the AC input and the polyphase AC output.

11. An apparatus according to claim 10, wherein the control circuit is further operative to regulate a DC voltage between the first and second DC voltage busses responsive to a relationship among the phase components associated with the AC input and the polyphase AC output.

12. An apparatus according to claim 9, wherein the control circuit is operative to determine a maximum phase voltage and a minimum among the phase components associated with the AC input and/or the AC output, to regulate the DC voltage between the first and second DC voltage busses based on a difference between the determined maximum and minimum phase components, and to shift the DC voltage range between the first and second DC voltage busses with respect to the reference voltage based on relative magnitudes of the determined maximum and minimum phase components.

13. An apparatus according to claim 12, wherein the control circuit is operative to regulate the DC voltage between the first and second DC voltage busses such that the magnitude of the voltage between the first and second DC voltage busses is at least as great as the magnitude of the difference between the determined maximum and minimum phase components.

14. An apparatus according to claim 12, wherein the control circuit is operative to maintain relative magnitudes of voltages on the first and second DC voltage busses with respect to the neutral voltage in proportion to relative magnitudes of the maximum and minimum phase components.

15. An apparatus according to claim 12, wherein the control circuit is operative to conform voltages of the first and second DC voltage busses to an envelope defined by extrema of phase voltages at the AC input and/or the AC output.

16. An apparatus according to claim 1:
wherein the DC to AC converter circuit comprises an inverter circuit operative to selectively couple the AC output to the first and second DC voltage busses responsive to an inverter control signal; and
wherein the control circuit comprises a control circuit operative to generate the inverter control signal responsive to the relationship among the phase components associated with the polyphase AC output.

17. An apparatus according to claim 16:
wherein the inverter circuit selectively couples the first and second DC voltage busses to the AC output responsive to a pulse width modulated control signal;
wherein the control circuit comprises:
  a PWM count generator that generates a PWM count responsive to a voltage reference signal;
  a zero sequence offset generator that generates a zero sequence offset responsive to the relationship among the phase components associated with the polyphase AC output; and
  a PWM signal generator that offsets the PWM count according to the zero sequence offset and generates the pulse width modulated control signal from the offset PWM count.

18. An apparatus according to claim 17:
wherein the inverter circuit comprises respective half-bridge circuits operative to selectively couple the first and second DC voltages busses to respective phases of the AC output responsive to respective pulse width modulated control signals;
wherein the PWM count generator generates respective PWM counts for respective ones of the phases at the AC output responsive to the voltage reference signal; and
wherein the PWM signal generator offsets the PWM counts according to the zero sequence offset and generates the respective pulse width modulated control signals from the respective offset PWM counts.

19. An apparatus according to claim 17, wherein the pulse width modulated control signals comprise first pulse width modulated control signals, wherein the control circuit comprises a neutral bridge circuit operative to selectively couple the first and second DC voltage busses to and from the neutral responsive to a second pulse width modulated control signal, and wherein the PWM signal generator generates the second pulse width modulated control signal from the offset PWM counts.

20. An uninterruptible power supply (UPS) comprising:
first and second DC voltage busses;
a DC source operative to supply power to the first and second DC voltage busses;
a polyphase DC to AC converter circuit coupled to the first and second DC voltage busses and operative to generate a polyphase AC output; and
a control circuit operatively associated with the polyphase DC to AC converter circuit and configured to shift a DC voltage range of the first and second DC voltage busses with respect to a reference voltage responsive to a relationship among phase components associated with the polyphase AC output.

21. A UPS according to claim 20, wherein the reference voltage comprises a neutral voltage for the polyphase AC output.

22. A UPS according to claim 21, wherein the AC output includes a neutral terminal configured to be connected to a load connected to the AC output, and wherein the neutral voltage comprises a voltage at the neutral terminal.

23. A UPS according to claim 21, wherein the neutral voltage comprises a synthetic neutral voltage.

24. A UPS according to claim 20, wherein the control circuit is configured to shift the DC voltage range of the first and second DC voltage busses with respect to the reference voltage responsive to phase voltages of the polyphase AC output.

25. A UPS according to claim 20, wherein the phase components comprise phase modulation commands from which the polyphase AC output is generated.

26. A UPS according to claim 25, wherein the phase modulation commands comprise respective phase regulator outputs.

27. A UPS according to claim 20, wherein the polyphase DC to AC converter circuit comprises respective half-bridge circuits that drive respective phases of the polyphase AC output, and wherein the control circuit is operative to provide discontinuous modulation of at least one of the half-bridge circuits.

28. A UPS according to claim 20, wherein the DC source comprises:
an AC to DC converter circuit operative to serve as a primary power source that generates a DC voltage between the first and second DC voltage busses from an AC input; and
a secondary DC source operative to generate a DC voltage between the first and second DC voltage busses from an AC input.

29. A method of operating a polyphase power converter that is operative to generate a polyphase AC output from a DC voltage on a DC link including first and second DC voltage busses, the method comprising:
shifting a voltage range between the first and second DC voltage busses with respect to a reference voltage for the polyphase AC output responsive to a relationship among phase components associated with the polyphase AC output.

30. A method according to claim 29, wherein the reference voltage comprises a neutral voltage.

31. A method according to claim 30, wherein the neutral voltage is one of an actual voltage of a neutral of a load receiving the polyphase AC output or a synthetic neutral for a load receiving the polyphase AC output.

32. A method according to claim 29, wherein shifting a voltage range comprises shifting the voltage range between the first and second DC voltage busses with respect to the reference voltage responsive to a relationship among phase voltages of the polyphase AC output.

33. A method according to claim 29, wherein the phase components comprise phase modulation commands from which the polyphase AC output is generated.

34. A method according to claim 33, wherein the phase modulation commands comprise respective phase regulator outputs.

35. A method according to claim 29, wherein shifting a voltage range comprises discontinuously modulating at least one of a plurality of half-bridge circuits of a polyphase DC to AC converter circuit that generates the polyphase AC output.

36. A method according to claim 29, wherein shifting a voltage range comprises:
   determining a maximum phase component and a minimum phase component; and
   regulating voltages on the first and second DC voltage busses with respect to the neutral based on relative magnitudes of determined maximum and minimum phase components.

37. A method according to claim 36, further comprising regulating a voltage difference between the first and second DC voltage busses based on the determined maximum and minimum phase components.

38. A method according to claim 29, wherein shifting a voltage range comprises generating PWM commands for an output inverter that produces the polyphase AC output responsive to the relationship among the phase components.

* * * * *